Jan. 13, 1942.    P. B. SCHARF    2,269,695
INSULATING COUPLING
Filed April 4, 1941    5 Sheets-Sheet 1
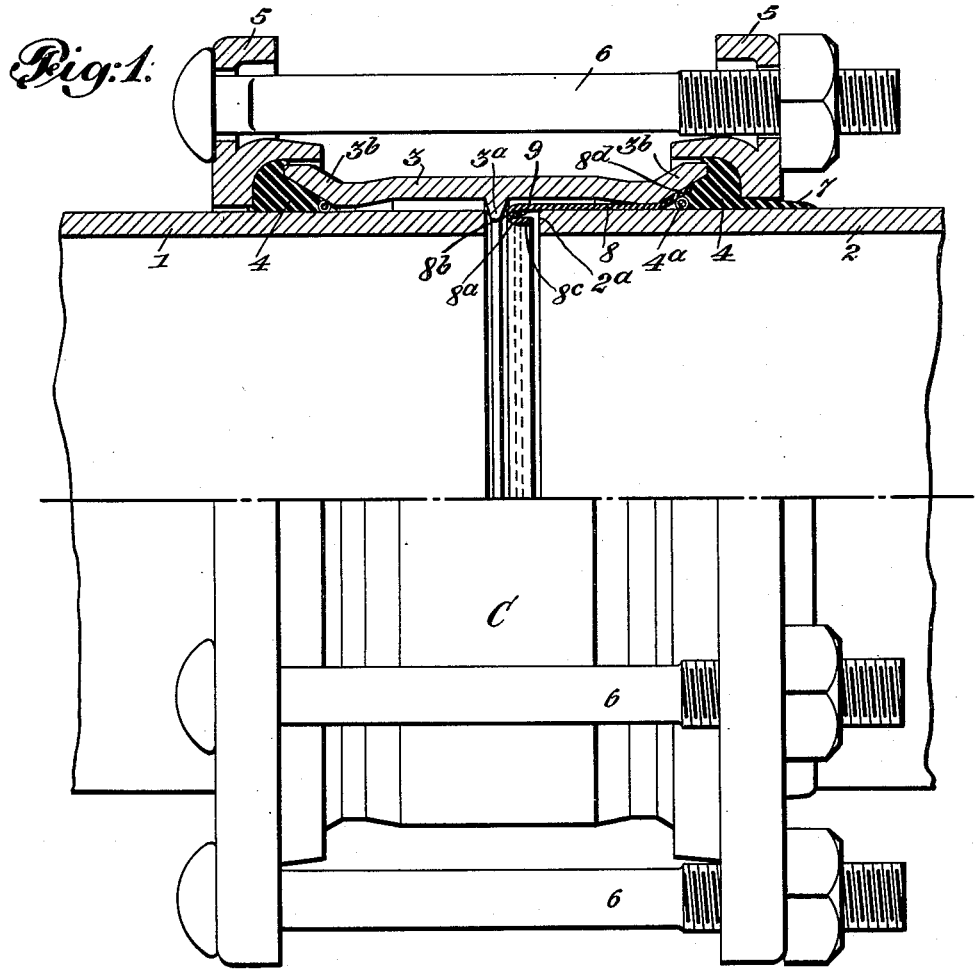
Fig:1.
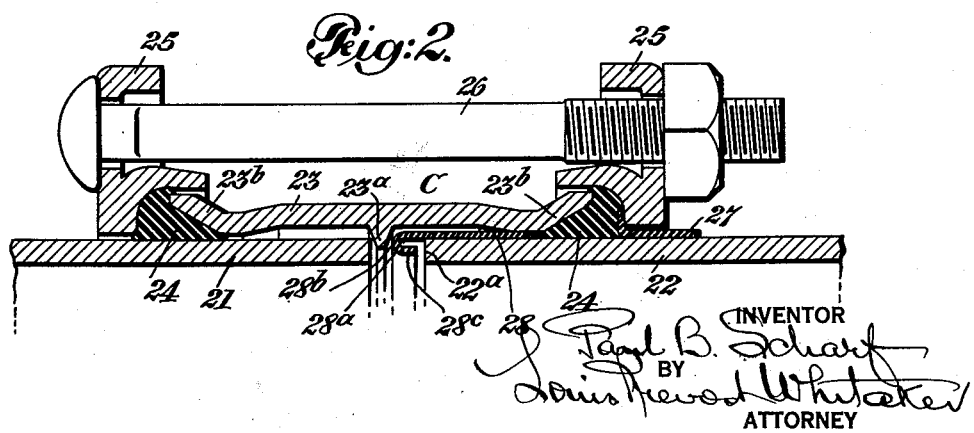
Fig:2.

Jan. 13, 1942. P. B. SCHARF 2,269,695
INSULATING COUPLING
Filed April 4, 1941  5 Sheets-Sheet 2
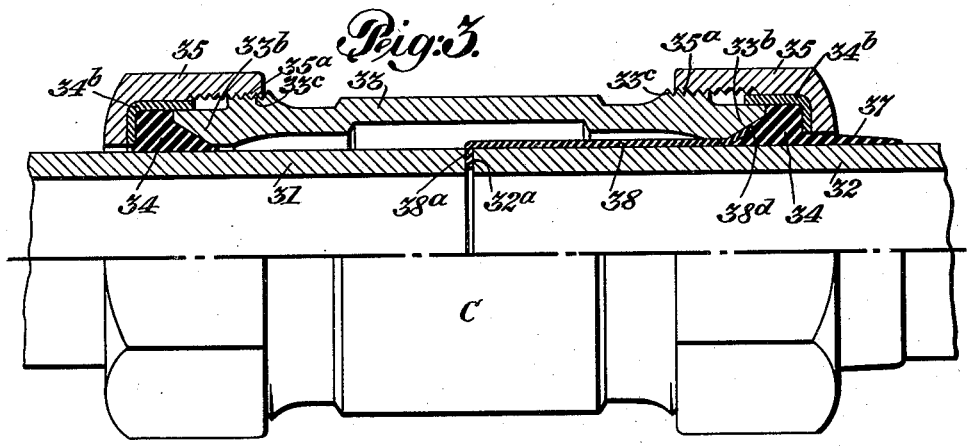
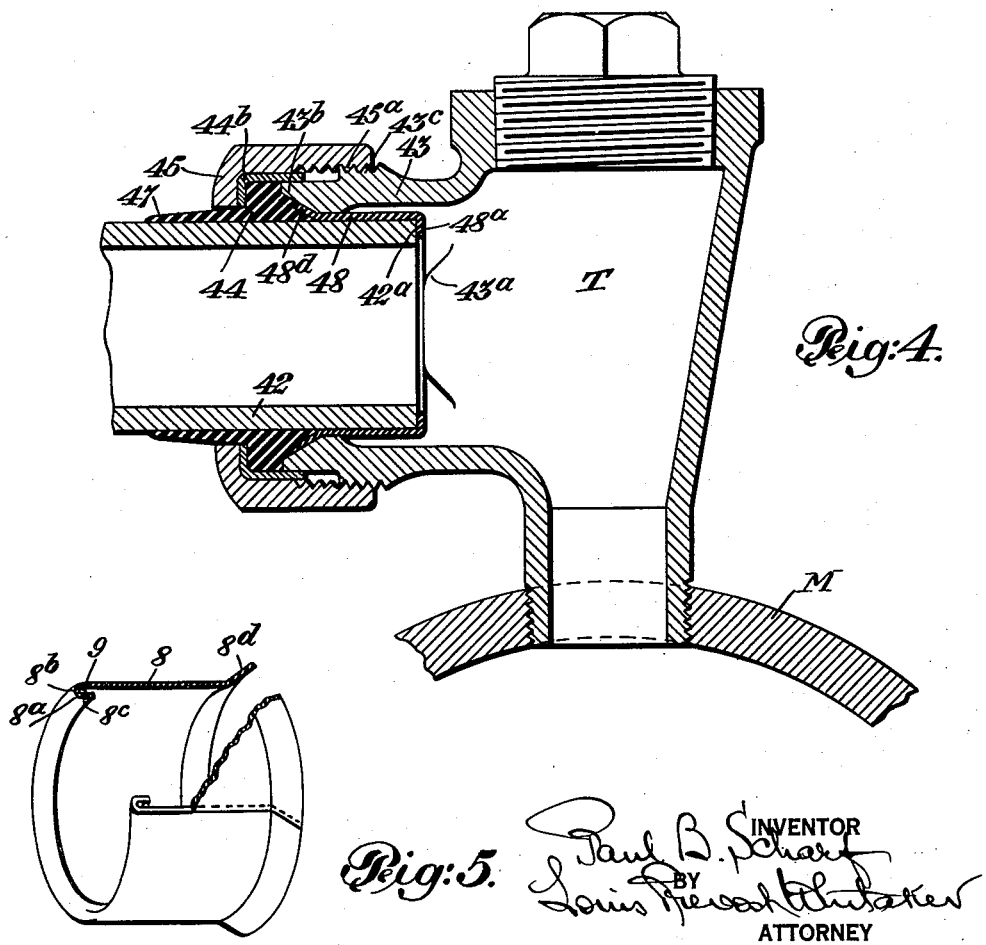

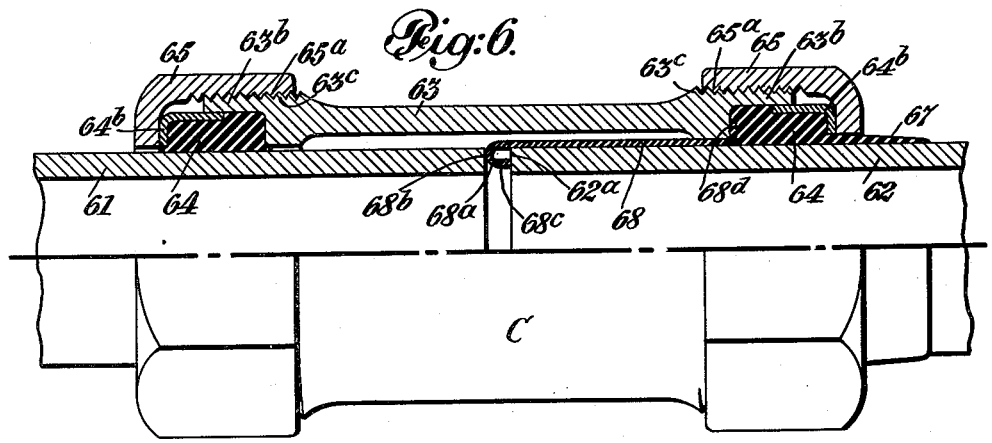

Jan. 13, 1942. P. B. SCHARF 2,269,695
INSULATING COUPLING
Filed April 4, 1941 5 Sheets-Sheet 4
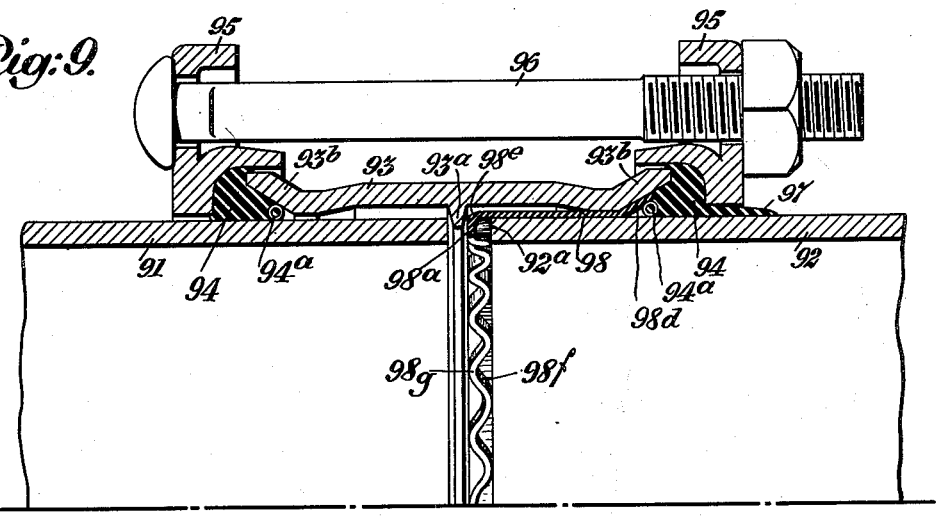
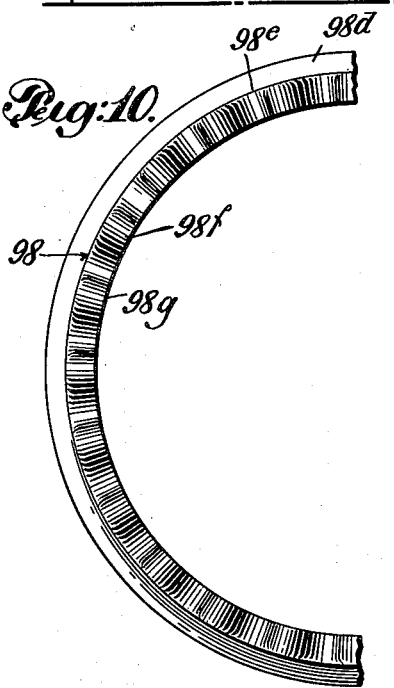
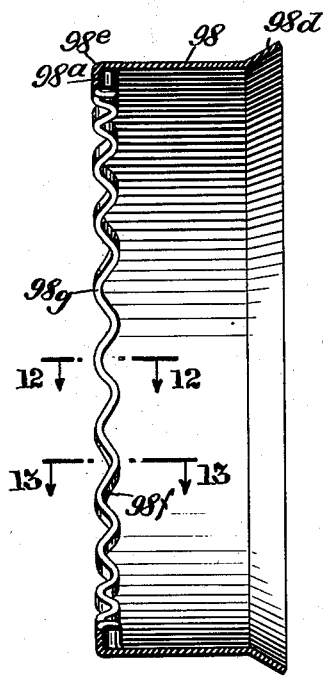
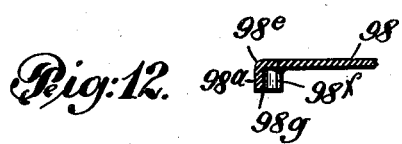
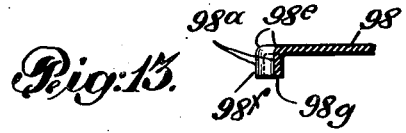
INVENTOR
Paul B. Scharf
BY
Louis Prevost Whitaker
ATTORNEY Jan. 13, 1942.  P. B. SCHARF  2,269,695
INSULATING COUPLING
Filed April 4, 1941  5 Sheets-Sheet 5

INVENTOR
Paul B. Scharf
BY Louis Prevost Whitaker
ATTORNEY

Patented Jan. 13, 1942

2,269,695

UNITED STATES PATENT OFFICE 2,269,695

INSULATING COUPLING

Paul B. Scharf, Bradford, Pa., assignor to Dresser Manufacturing Company, Bradford, Pa., a corporation of Pennsylvania Application April 4, 1941, Serial No. 386,807

7 Claims. (Cl. 285—196)

The present invention relates to pipe couplings for joining the adjacent ends of two pipe members and insulating them from one another. As a metal pipe is of considerably lower electrical resistance than the soil. a pipe laid underground tends to pick up electric currents arising, for example. from the groundings of electric power equipment, the ground return of electric railway systems, etc. Where the current is allowed to accumulate and flow along a pipe line unimpeded, it may assume such proportions as to cause serious damage to the pipe by electrolytic action. Moreover, when two pipes of dissimilar metals, for example, galvanized iron and copper are joined together, the resulting galvanic action and corrosion may eventually cause failure of the pipe.

To avoid this deleterious electrolytic or galvanic action, it has been proposed to insulate the pipe coupling from one or both ends of the pipe by a rubber sleeve of the same composition as the rubber gasket of the coupling. In some instances the rubber sleeve has been made integral with the gasket. Under certain conditions such insulating couplings have not been found to be wholly satisfactory. Even though the best quality rubber is used, the insulating sleeves may frequently be attacked by gasoline, oil or a lime condensate and swell up and close the line or slough off into and contaminate the line content. Moreover, it has been found that rubber does not have sufficient mechanical strength and rigidity to withstand the forces developed in a coupling under such conditions. The portion of the insulating sleeve located between the end face of the pipe and an abutting surface which may be the end of the adjacent pipe or a stop provided on the interior of the coupling sleeve is subjected to high stresses upon flexion of the pipe line, for example because of settling, and the rubber may be cut by the abutting surfaces or may be squeezed out from between them by cold flow of the rubber. This difficulty is particularly serious in the case of heavy, large-diameter pipe lines. When the rubber insulating sleeve is made integral with the gasket, a further difficulty has been experienced in that in molding the combined sleeve and gasket, the rubber fails to fill the mold completely owing to the small cross-section of the sleeve in proportion to its length, with the result that a high percentage of the articles must be scrapped.

It has also been proposed to insulate the coupling sleeves from the pipe by a member formed of sheet metal coated with insulating enamel. The sheet metal forming the body of the insulating member is not of course an insulating material, and any failure of the enamel coating results in failure of the insulator. Experience has shown that the enamel, being frangible, chips off under the severe stresses to which the coupling may be subjected in practice, leaving the bare metal of the insulating member exposed.

An object of the present invention is to overcome the difficulty encountered in the prior art and provide an insulating pipe coupling which is thoroughly dependable and will remain in service under adverse conditions over long periods of time. In accordance with the invention there is provided in a pipe joint having a sleeve member surrounding the end portion of a pipe and forming therewith an annular gasket recess, clamping means for applying pressure to a gasket disposed in the recess to seal the joint and an abutment for the end face of the pipe, an insulating member for insulating the said sleeve from the pipe comprising a stiff sleeve formed of high tensile strength, electrical insulating material surrounding the pipe, and extending from the gasket to the end of the pipe with the end portion of said insulating member curled inwardly to form a bead of substantial axial extent disposed between the end face of the pipe and said abutment. The inwardly curled end of the sleeve provides a strong bead of insulating material which has great resistance to crushing. At the same time, the curved or arched structure of the curled over end portion of the insulating sleeve affords a certain amount of resiliency, permitting the inturned bead to yield to unusually high stresses without being cut or ruptured. The material forming the insulating sleeve is relatively hard and stiff as compared with gasket rubber, so that it retains its shape and strongly resists deformation. As compared with enamel, the material is of high tensile strength, non-frangible and relatively resilient so as to bend without breaking.

A suitable material for the insulating sleeve is fibrous plastic material by which is meant a material composed of fibrous material and a suitable plastic, for example, an artificial resin. The material is preferably made in sheet form and a strip of the material is then bent into a ring and the edge rolled over to form the inturned bead. The formation of the insulating member can be facilitated by using a thermoplastic material and applying heat during the shaping operation.

Another feature of the invention is that the outer end of the insulating sleeve extends into the gasket space of the coupling and is anchored in position by the pressure of the gasket. By flaring the anchor portion of the insulating sleeve outwardly to conform to the outwardly flared portion of the coupling sleeve forming the gasket base, the insulating sleeve is positively held in correct position relative to the coupling sleeve and the inturned inner end of the insulating sleeve correctly positions the end of the pipe, thereby rendering unnecessary the usual pipe stop. The extension of the insulating sleeve a considerable distance into the gasket space beyond the toe of the gasket has a further important advantage when used with an armored gasket. The metal armor of a gasket may become exposed either in manufacture or through subsequent deterioration of the adjacent rubber in use, for example, through attack by gas, oil or gasoline in the pipe line, and makes electrical contact with the pipe and the coupling sleeve. The anchor portion of the insulating sleeve of the present invention effectively insulates the metal armor of the gasket even when thus exposed, and prevents it from short-circuiting the insulating coupling.

The features and advantages of the invention will be more fully understood from the following description and claims and the accompanying drawings, showing by way of example several embodiments of the invention.

In the drawings,

Fig. 1 is a longitudinal view partially in section of a pipe joint in accordance with the invention.

Fig. 2 is a longitudinal sectional view through one side of a pipe joint showing a slightly different construction.

Fig. 3 is a longitudinal view partially in section of a different type pipe coupling used for smaller diameter pipes.

Fig. 4 is a sectional view showing the application of the invention to a street T.

Fig. 5 is a perspective view of the insulating member of Fig. 1 with portions of the member broken away.

Fig. 6 is a longitudinal view partially in section of a pipe joint showing the application of the invention to a coupling employing a gasket of rectangular cross section.

Fig. 7 is an enlarged fragmentary sectional view corresponding to Fig. 3 but showing an armored gasket of wedge cross section.

Fig. 8 is an enlarged fragmentary sectional view corresponding to Fig. 6, but showing an armored gasket of rectangular cross section.

Fig. 9 is a longitudinal sectional view of another embodiment of the invention.

Fig. 10 is a partial end view of the insulating member of the pipe joint shown in Fig. 9.

Fig. 11 is a sectional view taken through the axis of the insulating member.

Fig. 12 is a fragmentary sectional view taken on the line 12—12 of Fig. 11.

Fig. 13 is a fragmentary sectional view taken on the line 13—13 of Fig. 11.

Figure 14:
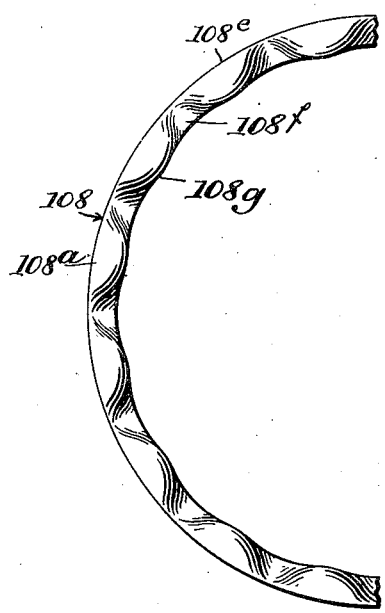
Fig. 14 is a partial end elevation of a slightly different form of insulating member.

In Fig. 1 there is shown a pipe joint in which the adjacent ends of two pipe members 1 and 2 are joined by a coupling C. The coupling comprises a sleeve member or middle ring 3, having a pipe stop 3a adapted to abut the end faces of the pipe members to position them relative to the sleeve. The outer ends of the sleeve 3 are flared to provide gasket recesses in each of which there is located an annular gasket 4. The toe of the gasket is reinforced by a coil of wire 4a. Clamping means are provided for applying pressure to the gasket to seal the joint and in the form shown comprises clamping rings 5 and through bolts 6.

In order to provide an insulated joint, it is necessary to keep the two pipes out of contact with one another and to insulate at least one of them from the coupling C. As the gasket 4 is commonly formed of a rubber composition, it provides a partial insulation for the coupling. To fully insulate the clamping ring 5 from the pipe, the heel of the gasket may be provided with a skirt or collar 7, which extends out between the clamping ring and the pipe, and electrically insulates them from one another. The skirt 7 preferably extends a substantial distance beyond the outer face of the clamping ring 5 to decrease the possibility of currents shunting around the coupling in the case of a highly conductive soil.

The coupling sleeve 3 is insulated from the pipe 2 by an insulating sleeve or ring 8 formed throughout of hard, tough, non-frangible insulating material. The insulating sleeve 8 surrounds the pipe and extends from the gasket recess to and beyond the end of the pipe. The projecting inner end portion of the insulating sleeve 8 is curled inwardly and back on itself through an angle of at least 180° to form an inturned bead designated generally by the reference numeral 8a. In the form shown in Fig. 1, the bead 8a comprises an inwardly extending arcuate portion 8b and an axially extending flange portion 8c. It will be seen that the inturned bead 8a is disposed between the end face 2a of the pipe 2 and the abutting surface of the pipe stop 3a of the coupling sleeve 3. The axially extending flange portion 8c of the bead holds the end of the pipe away from the pipe stop 3a so that the corner of the pipe cannot pinch the inwardly extending portion of the bead against the pipe stop and thus possibly cut through it. The flange also acts as a reinforcement to the arcuate portions, and provides a strong construction that cannot be readily crushed. At the same time the inturned coil of insulating material constituting the bead 8a possesses a certain amount of resilience and upon being subjected to unusually high stresses will give without breaking and without destroying the insulating properties of the coupling. The insulating coupling of the present invention thus withstands the forces imposed by deflection of the pipe and overcomes a frequent source of failure in prior art couplings.

In forming the inturned bead 8a, the end portion of the insulating sleeve 8 may be curled inwardly about an annular reinforcing member 9, which further supports and reinforces the bead against pinching or crushing. The reinforcing member may be formed of a ring of wire or other suitable material.

As shown in Fig. 1, the insulating sleeve 8 extends a substantial distance into the gasket space and overlaps the gasket 4. This extension of the insulating sleeve into the gasket space serves two important functions, namely, (1) it permits the use of an armored gasket, and (2) it positively positions the insulating sleeve with respect to the coupling sleeve 3. It is frequently desirable to reinforce the gasket with metallic armor, for example, a coil of wire disposed in the toe portion of the gasket. While the metallic armor is preferably covered with a layer of rubber, it may in some instances be exposed either in the course of manufacture or through deterioration of the overlying rubber coating during use. Were it not for the extended portion of the insulating sleeve, the exposed metal armor would contact the pipe and the coupling sleeve 3, and thereby short circuit the insulating coupling. However, by extending the insulating sleeve 8 a substantial distance into the gasket recess, as indicated at 8d in Fig. 1, the metallic armor is at all times fully insulated and such short circuiting prevented.

It will be further noted that the extended portion 8d of the insulating sleeve 8 is flared outwardly to conform to the flared end 3b of the coupling sleeve 3 and lies between the coupling sleeve and the gasket 4. In assembling the coupling, the flared end 8d of the insulating sleeve 8 assists in positioning the sleeve with respect to the coupling sleeve 3 and upon insertion of the gasket 4 and application to the gasket by the clamping ring 5, the insulating sleeve is clamped tightly between the gasket and the flared end 3d of the coupling sleeve, and is thereby secured in proper position. The flared end of the insulating sleeve thus serves as an anchor portion for positioning the sleeve in the coupling.

The sleeve 8 is formed of insulating material, which is sufficiently tough and strong to retain its shape and withstand the forces imposed by deflection of the pipe, and at the same time is tough and non-frangible. The material is also immune to attack by line contents such as oil, gasoline, drip oil, condensate, etc. A suitable material is a fibrous plastic material, by which is meant a material composed in part of fibrous materials, for example, cellulosic or asbestos fibres and in part of plastic material, for example, an artificial resin having the desired properties. The material used is preferably thermoplastic to facilitate formation of the insulating sleeve. The sleeve can be molded in endless form or shaped from tubular stock, but for purposes of economy it is preferably made of sheet stock, which is rolled into rings and given the proper shape and then baked. To avoid interfering with the centering of the pipe, it is preferable that the ring be of uniform thickness, and for this purpose the end of the material forming the ring may be abutted without overlapping. The purpose of the insulator is to keep the metal parts of the coupling out of engagement with the pipe, and a slight gap in the ring does not interfere with this function. An insulating sleeve in accordance with the invention is shown in perspective in Fig. 5.

In Fig. 2 there is shown a similar insulating coupling, in which corresponding parts are given the same reference numerals as in Fig. 1, with the addition of 20. In this embodiment of the invention, the clamping ring 25 is insulated from the pipe 22 by a separate collar 27 of fibrous plastic material instead of by a rubber collar integral with the gasket 4, as in Fig. 1. The plastic insulating collar 27 has the advantage of having greater shear strength than rubber and hence is preferably used in installations where danger of shear stresses is anticipated. In the embodiment shown in Fig. 2, the gasket 24 is not armored, and the insulating sleeve 28 does not extend appreciably into the gasket recess. Moreover, the annular reinforcing member 29 is omitted from the inturned bead 28a of the insulating sleeve.

Fig. 3, in which corresponding parts are designated by the same reference numerals as in Fig. 1 with the addition of 30, shows the application of the invention to a coupling for use on smaller diameter pipes. The coupling sleeve or middle ring 33 surrounds the adjacent ends of pipes 31 and 32 and is flared at its ends 33b to provide gasket recesses in each of which there is disposed an annular gasket 34. A cup shaped follower 34b fits over the gasket 34 and pressure is applied to the follower and the gasket by a clamping ring 35 which is threaded internally at 35a and screws onto a threaded portion 33d of the coupling sleeve. The clamping ring 35 is insulated from pipe 32 by a skirt 37 formed integrally with gasket 34. The coupling sleeve 33 is insulated from the pipe by an insulating member 38 which surrounds the pipe and extends from the gasket recess to and beyond the end of the pipe. The outer end of the insulating sleeve 38 extends a substantial distance into the gasket recess and is clamped between the gasket and the coupling sleeve, being flared outwardly to conform with the flared end of coupling sleeve 33. In assembling the coupling, this flared end portion 38d of the insulating member 38 prevents the member being pushed too far into the coupling sleeve 33 and correctly positions the insulator in the coupling. Upon application of pressure to the gasket 34, the insulating member 38 is tightly clamped between the gasket and the flared end portion 33b of the coupling sleeve 33 and is securely held in place. The inner end 38a of the insulating sleeve is turned inwardly over the end face 32a of the pipe 32 and serves to separate the end of the pipe from the abutting metallic surface, which in this case is the end face of pipe 31. In small diameter couplings, the coupling sleeve 33 may have no pipe stop corresponding to pipe stop 3a of Fig. 1, and in this event the insulating sleeve, in accordance with the present invention, serves the important additional function of properly positioning the ends of the pipes in the coupling. Since the insulating sleeve 38 is correctly positioned and securely held against longitudinal movement by the anchor portion 38d, the inturned inner end 38a of the insulating sleeve is effective as a pipe stop to correctly position the coupling with respect to the ends of the pipe when the pipe joint is being made, and preventing relative longitudinal movement of the parts thereafter.

Fig. 4 shows the application of the invention to a street T of the kind employed in connecting a house service line to a main. In this figure corresponding parts are given the same reference numerals as in Fig. 1 with the addition of 40. As the electrical equipment in a building is customarily grounded by being attached to the pipe system, the insulation of street T's for branch service lines is of particular importance. The street T T is screwed into the main M and has a coupling sleeve 43, which is similar to one-half the coupling sleeve 33 of Fig. 3. The gasket 44, follower 44b, and clamping ring 45, are similar to the corresponding parts shown in Fig. 3. The clamping ring 45 is insulated from the pipe by a skirt 47 formed integrally with the gasket 44. The coupling sleeve 43 is insulated from the pipe by an insulating member 48, which is similar to the insulator 38 of the preceding figure. It will be noted that the flared outer end 48d of the insulating member is clamped between the gasket 44 and the flared end 43b of the coupling sleeve, thereby securely anchoring the insulator in position. The inner end of the insulating sleeve 48 is turned inwardly over the end face 42a of the pipe, as indicated at 48a. An abutment 43a is customarily provided on the inside of the T to serve as a pipe stop limiting the extent the pipe can be pushed into the T. However, with the insulator of the present invention, such an abutment is not essential as the inturned inner end 48a of the insulating sleeve 48 correctly positions the pipe, the insulating sleeve being positioned and held against longitudinal movement by the flared anchor portion 48d.

A further embodiment of the invention is shown in Fig. 6 in which the corresponding parts are given the same reference numerals as in Fig. 1 with the addition of 60. The coupling shown in Fig. 6 is similar to that of Fig. 3, except that instead of being wedge shaped, the gasket 64 is of approximately rectangular cross section. The enlarged end portion 63b of the coupling sleeve 63 is correspondingly shaped to accommodate a rectangular gasket. In order to conform to the shape of the gasket recess, the outer end of the insulating sleeve 68 is flared outwardly to form a flange 68d approximately at right angles to the axis of the sleeve. When the coupling is assembled, the flange 68d is clamped between the coupling sleeve 63 and the inner end face of the gasket 64, thereby positively positioning the insulating sleeve 68 with respect to the coupling sleeve 63. The inner end of the insulating sleeve is curled inwardly and back on itself through an angle of at least 180° to form an inturned bead 68a comprising an inwardly extending arcuate portion 68b and an axially extending flange 68c. The inturned bead 68a of the insulating sleeve is disposed between the end face 62a of pipe 62 and an abutting surface, which in this case is the end face of the other pipe member 61. The axially extending flange 68c of the inturned bead 68a holds the two pipes apart and prevents the corners of the pipes from cutting or pinching the bent portion 68b. It will be noted that since the insulating sleeve 68 is held against longitudinal movement by the anchoring flange portion 68d, the inturned bead 68a acts as a pipe stop, accurately positioning the ends of the pipes with respect to the coupling.

In the embodiment of the invention shown in Fig. 7, corresponding parts are given the same reference numerals as in Fig. 1 with the addition of 70. The coupling shown in this figure is substantially the same as that of Fig. 3 except that the gasket 74 is reinforced by metal armor illustrated as a coil of wire 74a. It will be noted that the anchoring portion 78d of the insulating sleeve 78 extends a substantial distance into the gasket recess and in addition to its function of anchoring the insulating sleeve 78 in proper position with respect to the coupling sleeve 73, it fully insulates the metallic armor 74a from the coupling sleeve and effectively prevents the armor from short circuiting the coupling.

In Fig. 8 there is shown a further embodiment of the invention in which corresponding parts are given the same reference numerals as in Fig. 1, with the addition of 80. The coupling shown in Fig. 8 is substantially the same as that of Fig. 6 except that the rectangular gasket is reinforced by metallic armor illustrated as a coil of wire 84a. It will be seen that here, as in Fig. 7, the flange portion 88d of the insulating sleeve 88 serves not only as an anchor portion to position the insulating sleeve, but also acts as an effective insulation for the metallic armor 84a. It will be understood that the embodiments of the invention illustrated in the drawings are merely by way of example, and that the invention is applicable in like manner to other types of pipe joint. The invention may, for example, be embodied in bell and spigot joints or in T's, L's, crosses or other pipe fittings. The expressions "coupling sleeves" and "sleeve member" used in the description and claims are employed as indicating a sleeve-like portion of a pipe or fitting as well as a separate sleeve.

In Figs. 9 to 13 there is shown an embodiment of the invention in which the inturned end portions of the insulating sleeve member is curled transversely rather than circumferentially, to provide a strong resilient annular bead of substantially greater axial extent than the thickness of the insulating material. With this distinction the pipe joint of Figs. 9 to 13 is substantially the same as that of Fig. 1, and corresponding parts are given the same reference numerals with the addition of 90.

It will be seen that the inner end portion of the insulating sleeve 98 is turned inwardly along a wavy line 98e to form an inwardly projecting annular flange 98a having transverse undulations 98f. The undulations 98f extend radially the full width of the flange from the wavy line 98e to the inner edge 98g, and in the embodiment shown in the drawings, are of substantially the same depth (axially of the sleeve) throughout their radial extent. These transverse undulations greatly strengthen the flange, enabling it to resist being crushed between the end face 92a of the pipe 92 and any abutting surface, which in this case is the sleeve 93. The flange 98a is further reinforced and stiffened by reason of the fact that the junction line 98e of the flange with the body portion of the insulating sleeve 98 is undulated or wavy instead of lying in a single plane. At the same time the undulations give the flange a certain amount of resilience, so that in the event of unusually high forces being applied by the end face of the pipe and the pipe stop 93a, the flange of the insulated member will yield without being ruptured and without impairing the insulating properties of the coupling. It will be seen that by reason of the undulations, the inturned flange is of substantially greater axial extent than the thickness of the insulating material.

Figure 15:
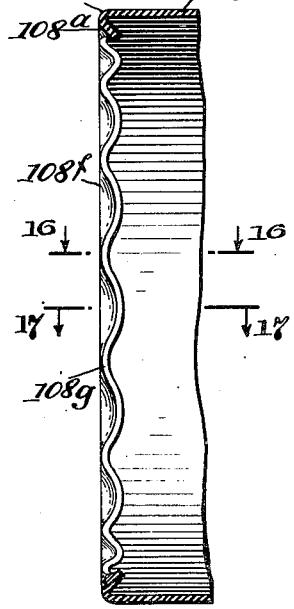
Fig. 15 is a fragmentary sectional view taken through the axis of the insulating member of Fig. 14.
Figure 16:
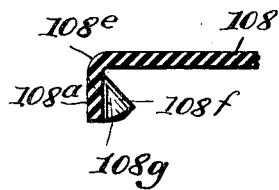
Fig. 16 is an enlarged fragmentary sectional view, taken on the line 16—16 of Fig. 15.
Figure 17:
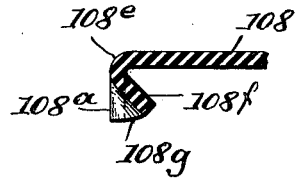
Fig. 17 is an enlarged fragmentary sectional view, taken on the line 17—17 of Fig. 15.

A further form of insulated member is shown in Figs. 14 to 17, in which corresponding parts are given the same reference numerals as in Fig. 1, with the addition of 100. This embodiment of the invention is the same as that of Figs. 9 to 13, except that the inturned bead of the insulating sleeve 108 is of slightly different formation. The inwardly projecting flange 108a is curled to provide transverse undulations 108f, and the inner edge 108g of the flange is of wavy configuration, as in the preceding embodiment. However, the line 108e at which the flange joins the body portion of the sleeve 108 is substantially circular rather than wavy so that the depth of the transverse undulations axially of the sleeve increases from a minimum at the outer edge of flange 108a to a maximum at the inner edge 108g. The curvature of each segment of the undulations is thus somewhat conical. As in the preceding embodiment the transverse undulations reinforce the inwardly turned end portion of the insulating sleeve member, and provide a strong yet resilient flange of substantially greater axial extent than the thickness of the insulating material.

It will be appreciated from the foregoing description that the applicant has discovered the causes of and has successfully overcome the failures in insulating couplings heretofore experienced. The insulating coupling in accordance with the present invention has been found to withstand the severe mechanical stresses encountered in underground pipe systems without increasing the weight or bulkiness of the coupling. Moreover, the invention makes possible the use of an armored gasket without danger of short circuiting the coupling and assures proper positioning of the insulating sleeve and the pipe with respect to the coupling sleeve even in the absence of the usual pipe stop. The invention thus represents a distinct advance in the art relating to insulating pipe couplings.

What I claim and desire to secure by Letters Patent is:

1. In a pipe joint having a sleeve member surrounding the end portion of a pipe and forming therewith an annular gasket recess, a gasket in said recess, clamping means for applying pressure to the gasket to seal the joint and a surface adapted to abut the end face of the pipe, means for insulating said sleeve from the pipe comprising a stiff sleeve formed of non-frangible electrical insulating material surrounding the pipe and projecting beyond the end thereof with the projecting portion turned inwardly and curled to form an undulating annular flange of substantially greater axial extent than the thickness of the insulating material.

2. In a pipe joint, the combination with a sleeve member surrounding the end portion of a pipe and forming therewith an annular gasket space, a gasket in said space and means for applying pressure to the gasket to seal the joint, of means for insulating said sleeve member from the pipe comprising a band of stiff, non-frangible electrical insulating material surrounding the pipe and having one end flared outwardly to form an anchor portion disposed in said gasket space and held by pressure of said gasket and having the other end turned inwardly over the end face of the pipe and curled to form an undulating annular flange of substantially greater axial extent than the thickness of the insulating material.

3. In a pipe joint having a sleeve member surrounding the end portion of a pipe and forming therewith a gasket recess, a gasket in said recess and means for applying pressure to the gasket to seal the joint, a member insulating said sleeve member from the pipe comprising a stiff sleeve formed of high strength non-frangible plastic material surrounding the pipes and projecting beyond the end thereof with the projecting portion turned inwardly along a wavy line to form an undulating annular flange having transverse undulations extending across the whole width of said flange.

4. In a pipe joint, the combination with a sleeve member surrounding the end portion of a pipe and forming therewith an annular gasket recess, a gasket in said recess, clamping means for applying pressure to the gasket to seal the joint and a surface adapted to abut the end face of the pipe, of means for insulating the pipe from said sleeve and abutting surface, comprising a stiff sleeve formed of high tensile strength, electrical insulating material projecting beyond the end of the pipe and having its projecting end curled inwardly and back on itself to form an axially extending flange spaced from the wall of said insulating sleeve and engaging the end face of the pipe.

5. In a pipe joint, the combination with a sleeve member surrounding the end portion of a pipe and forming therewith an annular gasket recess, a gasket in said recess, clamping means for applying pressure to the gasket to seal the joint and a surface adapted to abut the end face of the pipe, of means for insulating the pipe from said sleeve and abutting surface, comprising a sleeve of high tensile strength, fibrous plastic material surrounding the pipe and projecting beyond the end thereof, with the projecting portion curled inwardly and back on itself to form a flange having a substantially greater axial extent than the thickness of said material and engaging the end face of the pipe.

6. In a pipe joint, the combination with a sleeve member surrounding the end portion of a pipe and forming therewith an annular gasket recess, a gasket in said recess, and means for applying pressure to the gasket to seal the joint, of an insulating sleeve formed of stiff, high tensile strength, electrical insulating material surrounding the pipe and extending at one end into said gasket recess where it is held by the pressure of said gasket and projecting at the other end beyond the end of the pipe, with the projecting end of the insulating sleeve curled inwardly and back on itself to form an axially extending flange spaced from the wall of said insulating sleeve and engaging the end face of the pipe.

7. In a pipe joint, the combination with a sleeve member surrounding the end portion of a pipe and forming therewith an annular gasket space, a gasket in said space and means for applying pressure to the gasket to seal the joint, of means for insulating said sleeve member from the pipe comprising a band of stiff, high tensile strength, electrical insulating material surrounding the pipe and having one end flared outwardly to form an anchor flange disposed in said gasket space and held by pressure of said gasket and having the other end turned inwardly over the end face of the pipe to form a stop limiting longitudinal movement of the pipe into said sleeve member.

PAUL B. SCHARF.